United States Patent
Ho (10) Patent No.: US 11,614,997 B2
(45) Date of Patent: Mar. 28, 2023

(54) MEMORY STORAGE APPARATUS WITH PROTECTION OF COMMAND DATA IN A HOST BUFFER IN RESPONSE TO A SYSTEM ABNORMALITY

(71) Applicant: PHISON ELECTRONICS CORP., Miaoli (TW)

(72) Inventor: Hsiao-Chi Ho, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 73 days.

(21) Appl. No.: 17/306,896

(22) Filed: May 3, 2021

(65) Prior Publication Data

US 2022/0334920 A1 Oct. 20, 2022

(30) Foreign Application Priority Data

Apr. 14, 2021 (TW) .................................. 110113466

(51) Int. Cl.
*G06F 11/14* (2006.01)
*G06F 11/10* (2006.01)
(Continued)

(52) U.S. Cl.
CPC ........ *G06F 11/141* (2013.01); *G06F 11/0727* (2013.01); *G06F 11/0772* (2013.01);
(Continued)

(58) Field of Classification Search
CPC ............. G06F 11/0727; G06F 11/0772; G06F 11/1004; G06F 11/141; G06F 11/1441;
(Continued)

(56) References Cited

U.S. PATENT DOCUMENTS 9,996,291 B1 * 6/2018 Izhar .................... G06F 11/1441
2016/0054942 A1 * 2/2016 Yu ............................ G06F 3/064
714/773

(Continued)

OTHER PUBLICATIONS

Bjørling Matias et al., LightNVM: The Linux Open-Channel SSD Subsystem, 2017, USENIX, <https://www.usenix.org/system/files/conference/fast17/fast17-bjorling.pdf> (Year: 2017).*

Primary Examiner — Bryce P Bonzo
Assistant Examiner — Albert Li
(74) Attorney, Agent, or Firm — JCIPRNET (57) ABSTRACT

A method for managing a host memory buffer, a memory storage apparatus, and a memory control circuit unit are provided. The method includes: detecting whether a system abnormality occurs; copying a first command and first data corresponding to the first command stored in a data buffer of a host system to the memory storage apparatus in response to determining that the system abnormality occurs; executing an initial operation after copying the first command and the first data, wherein the initial operation initializes a part of a hardware circuit in the memory storage apparatus and does not initialize another part of the hardware circuit in the memory storage apparatus; and re-executing the first command stored in the memory storage apparatus after initializing the part of the hardware circuit.

21 Claims, 6 Drawing Sheets

(51) Int. Cl.
   *G06F 11/07*     (2006.01)
   *G06F 11/16*     (2006.01)
   *G06F 12/0804*    (2016.01)
   *G06F 12/0866*    (2016.01)
   *G06F 3/06*       (2006.01)

(52) U.S. Cl.
   CPC ...... *G06F 11/1004* (2013.01); *G06F 11/1441* (2013.01); *G06F 11/1658* (2013.01); *G06F 3/0659* (2013.01); *G06F 12/0804* (2013.01); *G06F 12/0866* (2013.01)

(58) Field of Classification Search
   CPC .. G06F 11/1658; G06F 3/0614; G06F 3/0619; G06F 3/0658; G06F 3/0659; G06F 12/0246; G06F 12/0804; G06F 12/0866; G06F 12/0873; G06F 2212/1032; G06F 2212/7201
   See application file for complete search history.

(56)           References Cited

U.S. PATENT DOCUMENTS

| | | | |
|---|---|---|---|
| 2017/0060668 A1* | 3/2017 | Farhan | G06F 12/0871 |
| 2017/0168890 A1* | 6/2017 | Marripudi | G06F 3/0619 |
| 2017/0300246 A1* | 10/2017 | Michaeli | G06F 3/0688 |
| 2019/0286351 A1* | 9/2019 | Ho | G06F 3/0656 |
| 2019/0294331 A1* | 9/2019 | Kunimatsu | G06F 12/0246 |
| 2019/0324859 A1* | 10/2019 | Armstrong | G11C 29/52 |
| 2020/0151055 A1* | 5/2020 | Eom | G06F 3/0619 |

\* cited by examiner

MEMORY STORAGE APPARATUS WITH PROTECTION OF COMMAND DATA IN A HOST BUFFER IN RESPONSE TO A SYSTEM ABNORMALITY

CROSS-REFERENCE TO RELATED APPLICATION

This application claims the priority benefit of Taiwan application serial no. 110113466, filed on Apr. 14, 2021. The entirety of the above-mentioned patent application is hereby incorporated by reference herein and made a part of this specification.

BACKGROUND

Technical Field

The disclosure relates to a memory buffer configuration technology, and particularly relates to a method for managing a host memory buffer, a memory storage apparatus, and a memory control circuit unit.

Description of Related Art

Digital cameras, mobile phones, and MP3 players have grown rapidly over the past few years, which has led to a rapid increase in consumer demand for storage media. Since the rewritable non-volatile memory module (for example, a flash memory) has characteristics such as non-volatile data, power saving, small size, and no mechanical structure, the rewritable non-volatile memory module is very suitable to be built in the various portable multimedia apparatuses exemplified above.

For the memory storage apparatus with different functions, in order to fully play the role of memory storage apparatus in improving the performance of an electronic apparatus, the host system currently has the function of providing a host memory buffer (HMB) for the memory storage apparatus. For example, for a solid state drive (SSD) with a storage space of 1 TB, the host system provides a storage space of about 1 GB as the host memory buffer thereof.

However, when there is an error in the data of the host memory buffer, in order to ensure the stability of the memory storage apparatus, the data stored in the host memory buffer is generally discarded and the memory storage apparatus is reset. However, such approach causes the host system to discover an abnormal condition in the memory storage apparatus.

SUMMARY

The disclosure provides a method for managing a host memory buffer, a memory storage apparatus, and a memory control circuit unit, which can remedy data of the host memory buffer when an unexpected error occurs and improve the operating efficiency of the memory.

The disclosure provides a method for managing a host memory buffer, which is applicable to a host system and a memory storage apparatus. The host system includes a host memory buffer and a data buffer, and the memory storage apparatus includes a rewritable non-volatile memory module. The method includes the following steps. Whether a system abnormality occurs is detected. A first command and first data corresponding to the first command stored in the data buffer of the host system are copied to the memory storage apparatus in response to determining that the system abnormality occurs. An initialization operation is executed after copying the first command and the first data. The initialization operation initializes a part of a hardware circuit of the memory storage apparatus and does not initialize another part of the hardware circuit. The first command stored in the memory storage apparatus is re-executed after initializing the part of the hardware circuit of the memory storage apparatus.

In an exemplary embodiment of the disclosure, before the step of copying a first command and first data corresponding to the first command stored in the data buffer of the host system to the memory storage apparatus in response to determining that the system abnormality occurs, the method further includes the following steps. An initialization program of an option read only memory of the memory storage apparatus is loaded to a random access memory of the host system. The initialization program is executed to configure a continuous physical address in the random access memory of the host system to the memory storage apparatus as the host memory buffer of the memory storage apparatus. The host memory buffer is configured to store a logical to physical mapping table.

In an exemplary embodiment of the disclosure, the memory storage apparatus does not include a dynamic random access memory.

In an exemplary embodiment of the disclosure, the system abnormality includes an abnormal restart or power failure of the host system.

In an exemplary embodiment of the disclosure, the system abnormality includes an error in a logical to physical mapping table stored in the host memory buffer.

In an exemplary embodiment of the disclosure, the above method further includes the following step. Whether there is an error in the logical to physical mapping table stored in the host memory buffer is determined according to a mapping table status flag. The mapping table status flag is generated when the host system confirms that there is an error in the logical to physical mapping stored in the host memory buffer according to a cyclic redundancy check bit.

In an exemplary embodiment of the disclosure, the part of the hardware circuit includes a memory interface in the memory storage apparatus for coupling to the rewritable non-volatile memory module, and another part of the hardware circuit includes a host interface in the memory storage apparatus for coupling to the host system.

In an exemplary embodiment of the disclosure, the step of re-executing the first command stored in the memory storage apparatus after initializing the part of the hardware circuit of the memory storage apparatus includes the following steps. A logical to physical mapping table is re-established according to data in the rewritable non-volatile memory module after initializing the part of the hardware circuit of the memory storage apparatus. The first command stored in the memory storage apparatus is re-executed according to the re-established logical to physical mapping table.

The disclosure provides a memory storage apparatus, which includes a connection interface unit, a rewritable non-volatile memory module, and a memory control circuit unit. The connection interface unit is configured to be electrically connected to a host system, and the host system includes a host memory buffer and a data buffer. The memory control circuit unit is coupled to the connection interface unit and the rewritable non-volatile memory module. The memory control circuit unit is configured to detect whether a system abnormality occurs. The memory control circuit unit is further configured to copy a first command and first data corresponding to the first command stored in the data buffer of the host system to the memory storage apparatus in response to determining that the system abnormality occurs. The memory control circuit unit is further configured to execute an initialization operation after copying the first command and the first data. The initialization operation initializes a part of a hardware circuit of the memory storage apparatus and does not initialize another part of the hardware circuit. Moreover, the memory control circuit unit is further configured to re-execute the first command stored in the memory storage apparatus after initializing the part of the hardware circuit of the memory storage apparatus.

In an exemplary embodiment of the disclosure, the memory storage apparatus further includes an option read only memory. Before the operation of copying the first command and the first data corresponding to the first command stored in the data buffer of the host system to the memory storage apparatus in response to determining that the system abnormality occurs, the memory control circuit unit is further configured to: load an initialization program of the option read only memory of the memory storage apparatus to a random access memory of the host system; and execute the initialization program to configure a continuous physical address in the random access memory of the host system to the memory storage apparatus as the host memory buffer of the memory storage apparatus. The host memory buffer is configured to store a logical to physical mapping table.

In an exemplary embodiment of the disclosure, the memory storage apparatus does not include a dynamic random access memory.

In an exemplary embodiment of the disclosure, the system abnormality includes an abnormal restart or power failure of the host system.

In an exemplary embodiment of the disclosure, the system abnormality includes an error in a logical to physical mapping table stored in the host memory buffer.

In an exemplary embodiment of the disclosure, the memory control circuit unit is further configured to: determine whether there is an error in the logical to physical mapping table stored in the host memory buffer according to a mapping table status flag. The mapping table status flag is generated when the host system confirms that there is an error in the logical to physical mapping stored in the host memory buffer according to a cyclic redundancy check bit.

In an exemplary embodiment of the disclosure, the part of the hardware circuit includes a memory interface in the memory control circuit unit for coupling to the rewritable non-volatile memory module, and the another part of the hardware circuit includes a host interface in the memory control circuit unit for coupling to the connection interface unit.

In an exemplary embodiment of the disclosure, the operation of re-executing the first command stored in the memory storage apparatus after initializing the part of the hardware circuit of the memory storage apparatus includes that the memory control circuit unit is further configured to re-establish a logical to physical mapping table according to data in the rewritable non-volatile memory module after initializing the part of the hardware circuit of the memory storage apparatus. Moreover, the memory control circuit unit is further configured to re-execute the first command stored in the memory storage apparatus according to the re-established logical to physical mapping table.

The disclosure provides a memory control circuit unit, which is disposed in a memory storage apparatus and is configured to control a rewritable non-volatile memory module. The memory control circuit unit includes a host interface, a memory interface, a buffer memory, and a memory management circuit. The host interface is configured to couple to a host system, and the host system includes a host memory buffer and a data buffer. The memory interface is configured to couple to the rewritable non-volatile memory module. The memory management circuit is coupled to the host interface and the memory interface. The memory management circuit is configured to detect whether a system abnormality occurs. The memory management circuit is further configured to copy a first command and first data corresponding to the first command stored in the data buffer of the host system to the memory storage apparatus in response to determining that the system abnormality occurs. The memory management circuit is further configured to execute an initialization operation after copying the first command and the first data. The initialization operation initializes a part of a hardware circuit of the memory storage apparatus and does not initialize another part of the hardware circuit. Moreover, the memory management circuit is further configured to re-execute the first command stored in the memory storage apparatus after initializing the part of the hardware circuit of the memory storage apparatus.

In an exemplary embodiment of the disclosure, the memory storage apparatus further includes an option read only memory. Before the operation of copying the first command and the first data corresponding to the first command stored in the data buffer of the host system to the memory storage apparatus in response to determining that the system abnormality occurs, the memory management circuit is further configured to: load an initialization program of the option read only memory of the memory storage apparatus to a random access memory of the host system; and execute the initialization program to configure a continuous physical address in the random access memory of the host system to the memory storage apparatus as the host memory buffer of the memory storage apparatus. The host memory buffer is configured to store a logical to physical mapping table.

In an exemplary embodiment of the disclosure, the memory storage apparatus does not include a dynamic random access memory.

In an exemplary embodiment of the disclosure, the system abnormality includes an abnormal restart or power failure of the host system.

In an exemplary embodiment of the disclosure, the system abnormality includes an error in a logical to physical mapping table stored in the host memory buffer.

In an exemplary embodiment of the disclosure, the memory management circuit is further configured to: determine whether there is an error in the logical to physical mapping table stored in the host memory buffer according to a mapping table status flag. The mapping table status flag is generated when the host system confirms that there is an error in the logical to physical mapping stored in the host memory buffer according to a cyclic redundancy check bit.

In an exemplary embodiment of the disclosure, the part of the hardware circuit includes the memory interface, and the another part of the hardware circuit includes the host interface.

In an exemplary embodiment of the disclosure, the operation of re-executing the first command stored in the memory storage apparatus after initializing the part of the hardware circuit of the memory storage apparatus includes that the memory management circuit is further configured to re-establish a logical to physical mapping table according to data in the rewritable non-volatile memory module after initializing the part of the hardware circuit of the memory storage apparatus. Moreover, the memory management circuit is further configured to re-execute the first command stored in the memory storage apparatus according to the re-established logical to physical mapping table.

Based on the above, in the method for managing the host memory buffer, the memory storage apparatus, and the memory control circuit unit provided by the embodiments of the disclosure, outstanding commands are stored in the memory storage apparatus and a part of the hardware circuit in the memory storage apparatus is initialized when an unexpected error occurs in the host memory buffer to avoid loss of commands and data, and to ensure that the host system does not detect any abnormality in the memory storage apparatus.

In order for the features and advantages of the disclosure to be more comprehensible, the following specific embodiments are according to detail in conjunction with the accompanying drawings.

DETAILED DESCRIPTION OF DISCLOSED EMBODIMENTS

Generally speaking, a memory storage apparatus (also known as a memory storage system) includes a rewritable non-volatile memory module and a controller (also known as a control circuit unit). Usually the memory storage apparatus is configured together with a host system, so that the host system may write data into the memory storage apparatus or read data from the memory storage apparatus.

Figure 1:
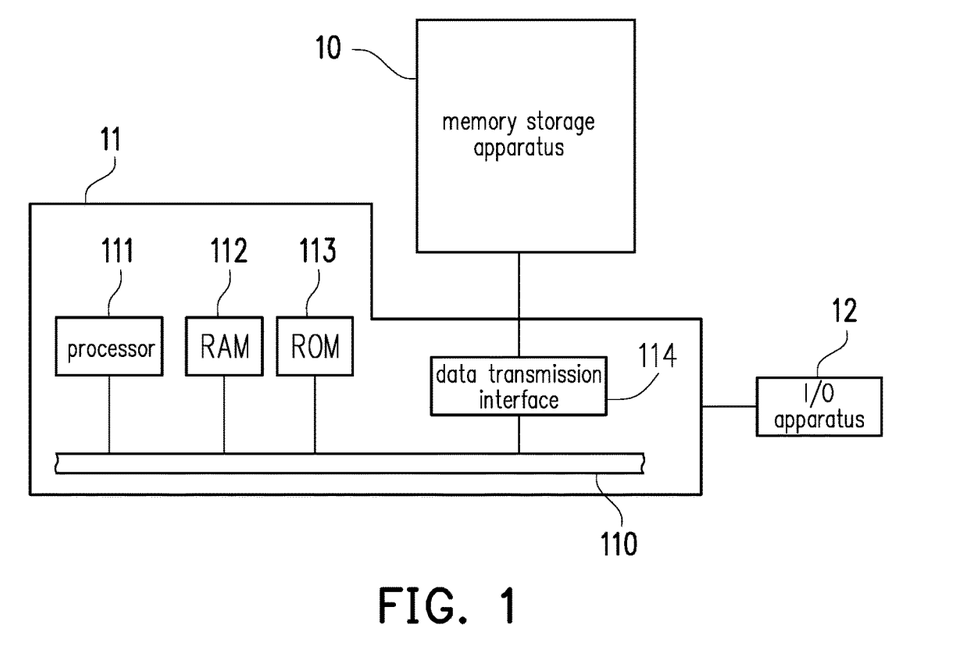
FIG. 1 is a schematic diagram of a host system, a memory storage apparatus, and an input/output (I/O) apparatus according to an exemplary embodiment.
Figure 2:
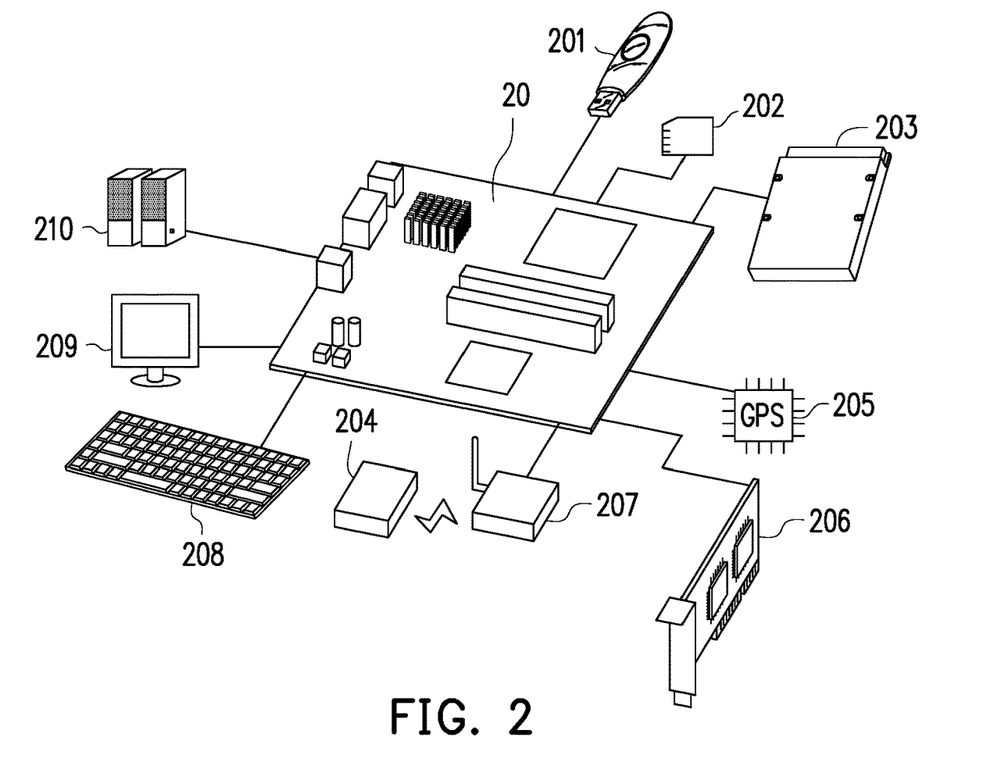
FIG. 2 is a schematic diagram of a host system, a memory storage apparatus, and an I/O apparatus according to another exemplary embodiment.

FIG. 1 is a schematic diagram of a host system, a memory storage apparatus, and an input/output (I/O) apparatus according to an exemplary embodiment. FIG. 2 is a schematic diagram of a host system, a memory storage apparatus, and an I/O apparatus according to another exemplary embodiment.

Please refer to FIG. 1 and FIG. 2. A host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In this exemplary embodiment, the host system 11 is coupled to a memory storage apparatus 10 through the data transmission interface 114. For example, the host system 11 may write data into the memory storage apparatus 10 or read data from the memory storage apparatus 10 via the data transmission interface 114. In addition, the host system 11 is coupled to the I/O apparatus 12 through the system bus 110. For example, the host system 11 may transmit an output signal to the I/O apparatus 12 or receive an input signal from the I/O apparatus 12 via the system bus 110.

In this exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage apparatus 10 via a wired or wireless manner. The memory storage apparatus 10 may be, for example, a flash drive 201, a memory card 202, a solid state drive (SSD) 203, or a wireless memory storage apparatus 204. The wireless memory storage apparatus 204 may be, for example, a near field communication (NFC) memory storage apparatus, a wireless fax (WiFi) memory storage apparatus, a Bluetooth memory storage apparatus, a low-power Bluetooth memory storage apparatus (for example, iBeacon), or other memory storage apparatuses based on various wireless communication technologies. In addition, the motherboard 20 may also be coupled to a global positioning system (GPS) module 205, a network interface card 206, a wireless transmission apparatus 207, a keyboard 208, a screen 209, a speaker 210, or various other I/O apparatuses through the system bus 110. For example, in an exemplary embodiment, the motherboard 20 may access the wireless memory storage apparatus 204 through the wireless transmission apparatus 207.

Figure 3:
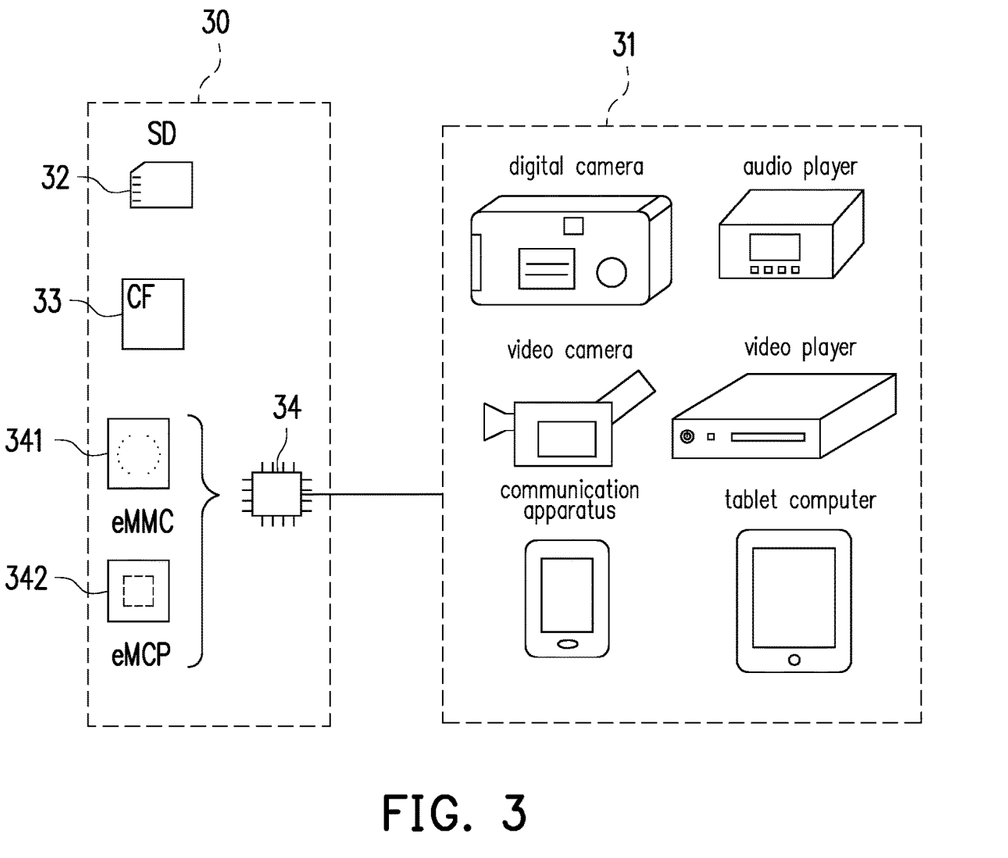
FIG. 3 is a schematic diagram of a host system and a memory storage apparatus according to another exemplary embodiment.

In an exemplary embodiment, the host system is any system that may cooperate with a memory storage apparatus to store data. Although in the above exemplary embodiment, the host system is described as a computer system, FIG. 3 is a schematic diagram of a host system and a memory storage apparatus according to another exemplary embodiment. Please refer to FIG. 3. In another exemplary embodiment, a host system 31 may also be a digital camera, a video camera, a communication apparatus, an audio player, a video player, a tablet computer, or other systems, and a memory storage apparatus 30 may be a secure digital (SD) card 32, a compact flash (CF) card 33, an embedded storage apparatus 34, or various other non-volatile memory storage apparatuses used thereby. The embedded storage apparatus 34 includes an embedded multi media card (eMMC) 341, an embedded multi chip package (eMCP) storage apparatus 342, and/or various other embedded storage apparatuses in which a memory module is directly coupled onto a substrate of a host system.

Figure 4:
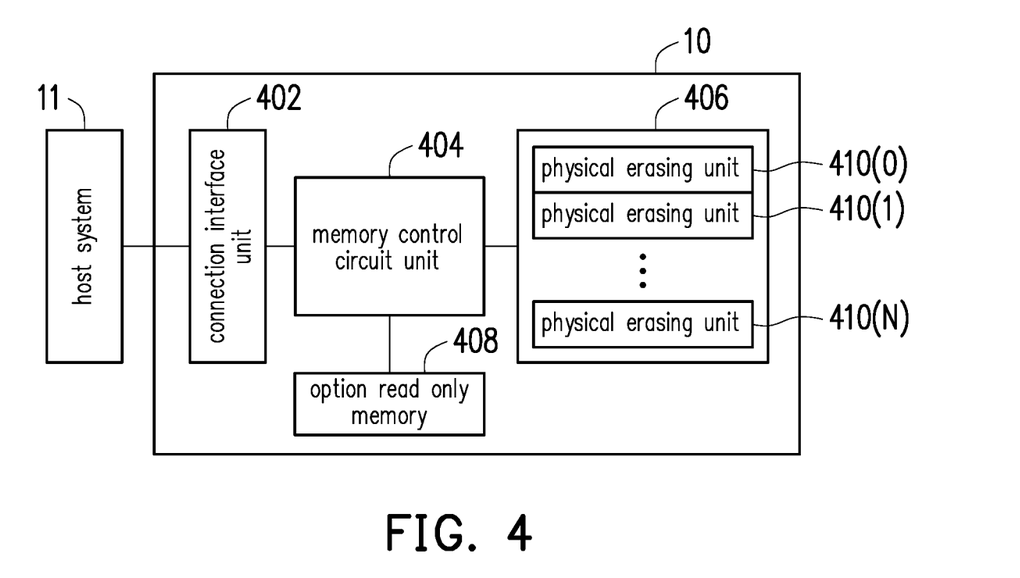
FIG. 4 is a schematic block diagram of a host system and a memory storage apparatus according to an exemplary embodiment of the disclosure.

FIG. 4 is a schematic block diagram of a host system and a memory storage apparatus according to an exemplary embodiment of the disclosure.

Please refer to FIG. 4. The memory storage apparatus 10 includes a connection interface unit 402, a memory control circuit unit 404, a rewritable non-volatile memory module 406, and an option ROM 408.

In this exemplary embodiment, the connection interface unit 402 is compatible with the SD interface standard. However, it must be understood that the disclosure is not limited thereto. The connection interface unit 402 may also conform to the serial advanced technology attachment (SATA) standard, the parallel advanced technology attachment (PATA) standard, the Institute of Electrical and Electronic Engineers (IEEE) 1394 standard, the high-speed peripheral component interconnect express (PCI express) standard, the universal serial bus (USB) standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. In this exemplary embodiment, the connection interface unit 402 and the memory control circuit unit 404 may be packaged in a chip, or the connection interface unit 402 may be arranged outside a chip containing the memory control circuit unit 404.

The memory control circuit unit 404 is configured to execute multiple logic gates or control commands implemented in a hardware form or a firmware form and perform operations such as data writing, reading, and erasing in the rewritable non-volatile memory module 406 according to a command of the host system 11.

The rewritable non-volatile memory module 406 is coupled to the memory control circuit unit 404 and is configured to store data written by the host system 11. The rewritable non-volatile memory module 406 has physical erasing units 410(0) to 410(N). For example, the physical erasing units 410(0) to 410(N) may belong to the same memory die or belong to different memory dies. Each physical erasing unit has multiple physical programming units. The physical programming units belonging to the same physical erasing unit may be independently written and simultaneously erased. However, it must be understood that the disclosure is not limited thereto, and each physical erasing unit may be composed of 64 physical programming units, 256 physical programming units, or any other number of physical programming units.

In more detail, the physical erasure unit is the smallest unit of erasure. That is, each physical erasing unit contains the smallest number of memory cells to be erased together. The physical programming unit is the smallest unit of programming. That is, the physical programming unit is the smallest unit of writing data. Each physical programming unit usually includes a data bit area and a redundancy bit area. The data bit area contains multiple physical access addresses to store user data and the redundancy bit area is configured to store system data (for example, management data such as control information and error correcting codes). In this exemplary embodiment, the data bit area of each physical programming unit contains 8 physical access addresses, and the size of one physical access address is 512 bytes. However, in other exemplary embodiments, the data bit area may also contain more or less physical access addresses, and the disclosure does not limit the size and number of physical access addresses. For example, in an exemplary embodiment, the physical erasing unit is a physical block, and the physical programming unit is a physical page or a physical sector, but the disclosure is not limited thereto.

In this exemplary embodiment, the rewritable non-volatile memory module 406 is a single level memory cell (SLC) NAND flash memory module (that is, a flash memory module that may store 1 bit in a memory cell). However, the disclosure is not limited thereto. The rewritable non-volatile memory module 406 may also be a multi level cell (MLC) NAND flash memory module (that is, a flash memory module that may store 2 bits in a memory cell), a trinary level cell (TLC) NAND flash memory module (that is, a flash memory module that may store 3 bits in a memory cell), or other memory modules with the same characteristics. Specifically, the memory cells on the same word line may form one or more physical programming units. If each memory cell may store more than 2 bits, the physical programming units on the same word line may be at least classified into a lower physical programming unit and an upper physical programming unit. For example, the least significant bit (LSB) of a memory cell belongs to the lower physical programming unit and the most significant bit (MSB) of a memory cell belongs to the upper physical programming unit. Generally speaking, in the MLC NAND flash memory, the writing speed of the lower physical programming unit is faster than the writing speed of the upper physical programming unit, and/or the reliability of the lower physical programming unit is higher than the reliability of the upper physical programming unit.

Each memory cell in the rewritable non-volatile memory module 406 stores one or more bits with a change in voltage (hereinafter also referred to as a threshold voltage). Specifically, there is a charge trapping layer between the control gate of each memory cell and the channel. Through applying a write voltage to the control gate, the amount of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 406 has multiple storage states. Through applying a read voltage, which storage state a memory cell belongs to may be determined, thereby obtaining one or more bits stored in the memory cell.

The option read only memory 408 is coupled to the memory control circuit unit 404 and executes a power-on self-test (POST) program, multiple initialization programs, and other programs stored in the option read only memory 408 through the memory control circuit unit 404 to provide firmware for implementing a POST, an initialization, and other operations.

Figure 5:
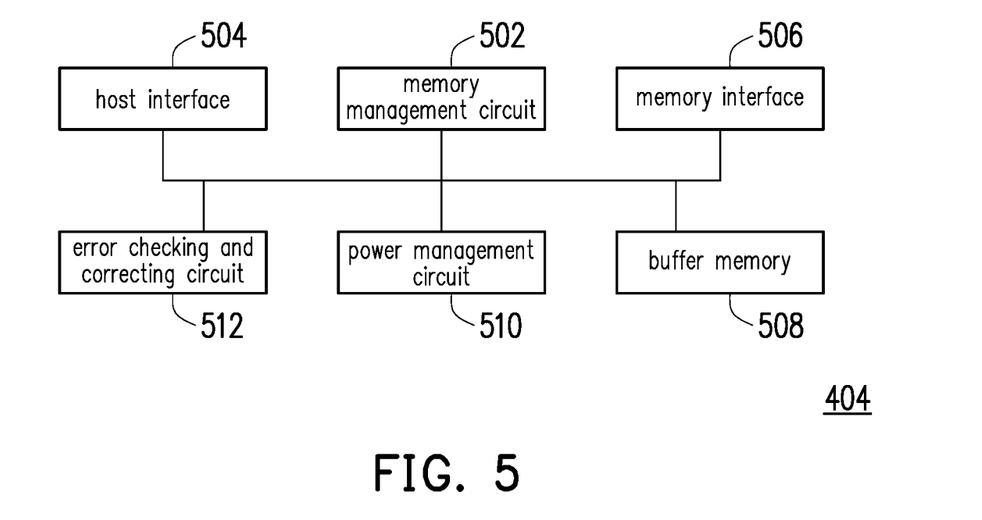
FIG. 5 is a schematic block diagram of a memory control circuit unit according to an exemplary embodiment of the disclosure.

FIG. 5 is a schematic block diagram of a memory control circuit unit according to an exemplary embodiment of the disclosure.

Please refer to FIG. 5. The memory control circuit unit 404 includes a memory management circuit 502, a host interface 504, and a memory interface 506.

The memory management circuit 502 is configured to control the overall operation of the memory control circuit unit 404. Specifically, the memory management circuit 502 has multiple control commands, and when the memory storage apparatus 10 is operating, the control commands are executed to perform operations such as data writing, reading, and erasing.

In this exemplary embodiment, the control commands of the memory management circuit 502 are implemented in a firmware form. For example, the memory management circuit 502 has a microprocessor unit (not shown) and a read only memory (not shown), and the control commands are programmed into the read only memory. When the memory storage apparatus 10 is operating, the control commands are executed by the microprocessor unit to perform operations such as data writing, reading, and erasing.

In another exemplary embodiment of the disclosure, the control commands of the memory management circuit 502 may also be stored in a specific area of the rewritable non-volatile memory module 406 (for example, a system area dedicated to storing system data in the memory module) in a program code form. In addition, the memory management circuit 502 has a microprocessor unit (not shown), a read only memory (not shown), and a random access memory (not shown). In particular, the read only memory has a boot code segment, and when the memory control circuit unit 404 is enabled, the microprocessor unit first executes the boot code segment to load the control commands stored in the rewritable non-volatile memory module 406 into the random access memory of the memory management circuit 502. After that, the microprocessor unit runs the control commands to perform operations such as data writing, reading, and erasing.

In addition, in another exemplary embodiment of the disclosure, the control commands of the memory management circuit 502 may also be implemented in a hardware form. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the physical erasing units of the rewritable non-volatile memory module 406. The memory writing circuit is configured to issue a write command to the rewritable non-volatile memory module 406 to write data into the rewritable non-volatile memory module 406. The memory reading circuit is configured to issue a read command to the rewritable non-volatile memory module 406 to read data from the rewritable non-volatile memory module 406. The memory erasing circuit is configured to issue an erase command to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406.

The host interface 504 is coupled to the memory management circuit 502 and is configured to be coupled to the connection interface unit 402 to receive and identify commands and data sent by the host system 11. In other words, the commands and data sent by the host system 11 are sent to the memory management circuit 502 through the host interface 504. In this exemplary embodiment, the host interface 504 is compatible with the SATA standard. However, it must be understood that the disclosure is not limited thereto. The host interface 504 may also be compatible with the PATA standard, the IEEE 1394 standard, the PCI Express standard, the USB standard, the UHS-I interface standard, the UHS-II interface standard, the SD interface standard, the MS interface standard, the MMC interface standard, the CF interface standard, the IDE interface standard, or other suitable data transmission standards.

The memory interface 506 is coupled to the memory management circuit 502 and is configured to access the rewritable non-volatile memory module 406 and the option read only memory 408. In other words, data to be written into the rewritable non-volatile memory module 406 are converted into a format acceptable by the rewritable non-volatile memory module 406 via the memory interface 506. The memory management circuit 502 loads the initialization program stored in the option read only memory 408 into the host system 11 through the memory interface 506.

Specifically, if the memory management circuit 502 intends to access the rewritable non-volatile memory module 406, the memory interface 506 will send a corresponding command sequence. For example, the command sequences may include a write command sequence instructing to write data, a read command sequence instructing to read data, an erase command sequence instructing to erase data, and corresponding command sequences instructing various memory operations (for example, changing a read voltage level, executing a garbage collection operation, etc.). The command sequences are, for example, generated by the memory management circuit 502 and are sent to the rewritable non-volatile memory module 406 through the memory interface 506. The command sequences may include one or more signals or data on a bus. The signals or data may include command codes or program codes. For example, the read command sequence includes read information such as an identification code and a memory address.

In an exemplary embodiment, the memory control circuit unit 404 further includes a buffer memory 508, a power management circuit 510, and an error checking and correcting circuit 512.

The buffer memory 508 is coupled to the memory management circuit 502 and is configured to temporarily store data and commands from the host system 11 or data from the rewritable non-volatile memory module 406. For example, the buffer memory 508 may include a dynamic random access memory (DRAM), a static random access memory (SRAM), or any memory that loses stored data due to power failure or unstable voltage supply. In addition, the buffer memory 508 is implemented in the memory control circuit unit 404 in a chipset or system on chip (SoC) manner, or is independent of the memory control circuit unit 404, and the disclosure is not limited thereto. The power management circuit 510 is coupled to the memory management circuit 502 and is configured to control the power of the memory storage apparatus 10.

The error checking and correcting circuit 512 is coupled to the memory management circuit 502 and is configured to execute an error checking and correcting procedure to ensure the correctness of data. Specifically, when the memory management circuit 502 receives a write command from the host system 11, the error checking and correcting circuit 512 generates a corresponding error checking and correcting code (ECC code) for data corresponding to the write command, and the memory management circuit 502 will write the data corresponding to the write command and the corresponding ECC code into the rewritable non-volatile memory module 406. After that, when the memory management circuit 502 reads data from the rewritable non-volatile memory module 406, the ECC code corresponding to the data is read at the same time, and the error checking and correcting circuit 512 will execute the error checking and correcting procedure on the read data according to the ECC code.

In this exemplary embodiment, the error checking and correcting circuit 512 is implemented by a low density parity code (LDPC). However, in another exemplary embodiment, the error checking and correcting circuit 512 may also be implemented by an encoding/decoding algorithm such as Bose-Chaudhuri-Hocquenghem (BCH) codes, convolutional codes, turbo codes, and bit flipping.

Specifically, the memory management circuit 502 generates an error correcting code frame (ECC frame) according to the received data and the corresponding ECC code (hereinafter also referred to as error correcting code), and writes the ECC frame into the rewritable non-volatile memory module 406. Later, when the memory management circuit 502 reads data from the rewritable non-volatile memory module 406, the error checking and correcting circuit 512 verifies the correctness of the read data according to the error correcting code in the ECC frame.

The following describes the operations executed by the memory management circuit 502, the host interface 504, the memory interface 506, the buffer memory 508, the power management circuit 510, and the error checking and correcting circuit 512, which may also be referred to as being executed by the memory control circuit unit 404.

In an exemplary embodiment, the memory management circuit 502 divides the rewritable non-volatile memory module 406 into multiple physical units (for example, physical erasing units), and groups the physical units into a data area and a spare area. The physical units in the data area are configured to store data and the physical units in the spare area are configured to replace the physical units in the data area when executing a write command. Specifically, when the memory storage apparatus 10 receives a write command from the host system 11 and intends to write the physical units in the data area, the memory management circuit 502 extracts a physical unit from the spare area, writes valid old data in the physical unit to be written in the data area and new data to be written into the physical unit extracted from the spare area and associates the physical unit having written with the new data with the data area, and erases the original physical unit in the data area and associates with the spare area. In order for the host system 11 to smoothly access the physical units that store data in a rotation manner, the memory management circuit 502 provides logical units to the host system 11. That is, the memory management circuit 502 establishes a logical to physical mapping table or a physical to logical mapping table, and records and updates the mapping relationship between the logical units and the logical units in the mapping table to reflect the rotation of the physical units. Therefore, the host system 11 only needs to write to the provided logical units and the memory management circuit 502 performs data reading or writing on the mapped physical units according to the logical to physical mapping table or the physical to logical mapping table.

As the memory manufacturing process progresses, the capacity of each physical unit and the number of physical units are designed to become larger and larger while the size of the mapping tables and the required update time also increase accordingly. At present, the host system has the function of providing a host memory buffer (HMB) for the memory storage apparatus, and the host memory buffer is configured to store the mapping tables.

Figure 6:
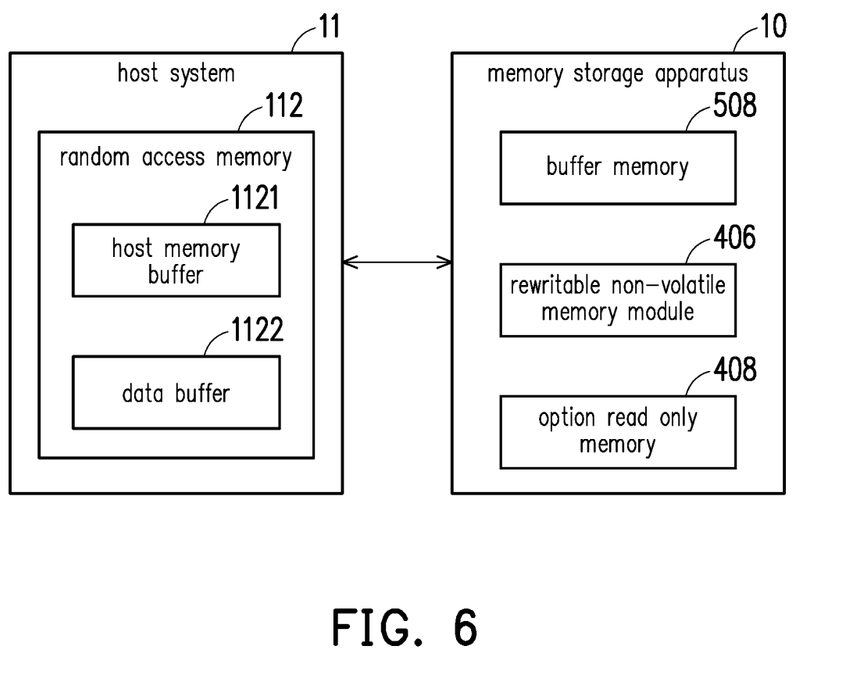
FIG. 6 is a schematic block diagram of a host system and a memory storage apparatus according to an exemplary embodiment of the disclosure.

FIG. 6 is a schematic block diagram of a host system and a memory storage apparatus according to an exemplary embodiment of the disclosure.

Please refer to FIG. 6. The host system 11 includes the random access memory 112. According to memory configuration parameters of the memory storage apparatus 10 electrically connected to the host system 11, a continuous physical address may be configured on the random access memory 112 to serve as a host memory buffer 1121 for the memory storage apparatus 10. The host memory buffer 1121 is configured to be provided to the memory storage apparatus 10 as an extended memory when the host system 11 uses the memory storage apparatus 10 electrically connected thereto, so as to improve the performance of the memory storage apparatus 10. In addition, the random access memory 112 also includes a data buffer 1122. The data buffer 1122 may be used as a cache memory. The host system 11 temporarily stores a command and corresponding command data in the cache memory to improve the overall operating efficiency of the system. In an embodiment, the continuous physical address in a dynamic random access memory may be configured as the host memory buffer 1121, and the data buffer 1122 may be implemented as a static random access memory (that is, SRAM), and the disclosure is not limited thereto. In this exemplary embodiment, the memory management circuit 502 is directly connected to the connection interface unit 402 through the host interface 504 to perform data transmission with the host memory buffer 1121. In other words, the command and data sent by the memory management circuit 502 are sent to the host memory buffer 1121 through the connection interface unit 402 by the host interface 504.

The memory storage apparatus 10 includes the option read only memory 408. An initialization program (also known as a first initialization program) is stored in the option read only memory 408. In an exemplary embodiment, the memory storage apparatus 10 is exemplified as a solid state drive. In this embodiment, the memory storage apparatus 10 may not have a dynamic random access memory (DRAM-less). However, it must be understood that the memory storage apparatus 10 may also be a flash drive or other electronic apparatuses that may be externally connected to the host system 11 and may improve the performance of the host system, and the disclosure is not limited thereto.

When the memory storage apparatus 10 is electrically connected to the host system 11, the host system 11 scans the memory storage apparatus 10 electrically connected thereto. If the first initialization program is stored in the option read only memory 408 of the memory storage apparatus 10, the host system 11 will load the first initialization program into the random access memory 112 of the host system 11 and execute the first initialization program. In addition, the host system 11 configures the continuous physical address in the random access memory 112 as the host memory buffer 1121 according to the memory configuration parameters set by the first initialization program, and sets a flag on the host memory buffer 1121 of the continuous physical address. The memory management circuit 502 stores the flag in the memory storage apparatus 10.

In this exemplary embodiment, the memory management circuit 502 may operate the host memory buffer 1121. For example, the memory management circuit 502 may store the logical to physical mapping table in the host memory buffer 1121. However, the host memory buffer 1121 is disposed on the host system 11. In other words, when the memory storage apparatus 10 supports the host memory buffer function, the memory storage apparatus 10 is coupled to the host memory buffer 1121 of the host system 11 and sends the logical to physical mapping table to the host memory buffer 1121 for storage. When the memory storage apparatus 10 receives a command from the host system 11, the memory management circuit 502 may access the logical to physical mapping table stored in the host memory buffer 1121.

In this exemplary embodiment, the memory management circuit 502 detects whether a system abnormality occurs. The system abnormality includes abnormal restart or power failure of the host system 11, or an error in the logical to physical mapping table stored in the host memory buffer 1121.

In an exemplary embodiment, the memory management circuit 502 may determine whether a previous restart or power failure of the host system 11 is an abnormal restart or an abnormal power failure according to a power failure status flag. The abnormal restart is, for example, restart of the host system 11 caused by an abnormal operation, and the abnormal power failure is, for example, abnormal shut down of the host system 11 caused by a sudden power failure or unstable voltage supply. The power failure status flag is generated by a processor (not shown) of the host system 11 when the abnormal restart or the abnormal power failure occurs in the host system 11. In addition, the power failure status flag may be stored in the memory storage apparatus 10. In this exemplary embodiment, if the memory management circuit 502 detects the power failure status flag, it may be determined that the system abnormality occurs.

In an exemplary embodiment, the memory management circuit 502 may determine whether there is an error in the logical to physical mapping table stored in the host memory buffer 1121 according to a mapping table status flag. The mapping table status flag is generated by a processor (not shown) of the host system 11 when the host system 11 detects an error in the logical to physical mapping stored in the host memory buffer 1121. For example, the host system 11 may use a cyclic redundancy check (CRC) to detect whether there is an error in the logical to physical mapping table stored in the host memory buffer 1121. Specifically, the memory management circuit 502 may generate a CRC bit of the logical to physical mapping table and store the logical to physical mapping table and the CRC bit in the host memory buffer 1121. The memory management circuit 502 may generate the CRC bit using any required manner, and the disclosure is not limited thereto. The host system 11 confirms whether there is an error in the logical to physical mapping table stored in the host memory buffer 1121 according to the CRC bit and generates the mapping status flag when confirming that there is an error in the logical to physical mapping table.

When the system abnormality occurs, it means that the host memory buffer 1121 of the host system 11 is unstable. In this exemplary embodiment, in response to determining that the system abnormality occurs, the memory management circuit 502 copies a command (also referred to as a first command) and data (also referred to as first data) corresponding to the first command temporarily stored in the data buffer 1122 of the host system 11 to the memory storage apparatus 10. For example, the memory management circuit 502 may copy the first command and the first data to the buffer memory 508 or the rewritable non-volatile memory module 406 of the memory storage apparatus 10. Specifically, the memory management circuit 502 may first determine whether there is any outstanding command or interrupt event currently stored in the data buffer 1122. If there are outstanding commands or interrupt events stored in the data buffer 1122, the memory management circuit 502 copies the outstanding commands or the interrupt events to the memory storage apparatus 10.

When the host system 11 is abnormal, the hardware circuit may be initialized in order to maintain the stability of the host system, which causes data stored in the random access memory 112 to be lost. In this way, through copying the backup first command and first data to the memory storage apparatus 10, the loss of outstanding commands and data may be avoided.

The memory management circuit 502 executes an initialization operation after copying the first command and the first data to initialize a part of the hardware circuit in the memory storage apparatus 10 and does not initialize another part of the hardware circuit. For example, the part of the hardware circuit includes the memory interface 506, and the another part of the hardware circuit includes the host interface 504, but the disclosure is not limited thereto. In an exemplary embodiment, the memory management circuit 502 initializes the part of the hardware circuit other than the memory management circuit 502, the host interface 504, and the buffer memory 508. The part of the hardware circuit includes, for example, the memory interface 506 that communicates with the rewritable non-volatile memory module 406, etc., and the disclosure is not limited thereto. Specifically, the memory management circuit 502 loads an initialization program (also referred to as a second initialization program) from the option read only memory 408 to the buffer memory 508 and executes the initialization operation to initialize the part of the hardware circuit other than the memory management circuit 502, the host interface 504, and the buffer memory 508 in the memory storage apparatus 10.

After initializing the part of the hardware circuit of the memory storage apparatus 10, the memory management circuit 502 re-executes the first command stored in the memory storage apparatus 10. Specifically, the memory management circuit 502 may first determine whether there is any outstanding command or interrupt event currently stored in the buffer memory 508 or the rewritable non-volatile memory module 406 of the memory storage apparatus 10. If outstanding commands or interrupt events are stored in the buffer memory 508, the memory management circuit 502 re-executes the outstanding commands or the interrupt events.

In an exemplary embodiment, the memory management circuit 502 may re-establish the logical to physical mapping table according to the data in the rewritable non-volatile memory module 406 after initializing the part of the hardware circuit of the memory storage apparatus 10. After re-establishing the logical to physical mapping table, the memory management circuit 502 re-executes the first command stored in the memory storage apparatus 10 according to the re-established logical to physical mapping table.

For example, the memory management circuit 502 may re-establish the logical to physical mapping table according to multiple physical to logical mapping information in the rewritable non-volatile memory module 406 and multiple time information corresponding to the physical to logical mapping information. However, the technical concepts related to re-establishing the physical to logical mapping table are technical means well known to persons skilled in the art, which will not be repeated here.

In addition, the memory management circuit 502 may restore the re-established logical to physical mapping table to the buffer memory 508, and then store the re-established logical to physical mapping table to the rewritable non-volatile memory module 406 at a specific time. In other words, the memory storage apparatus 10 temporarily discards the host memory buffer 1121 of the host system 11 and uses its own buffer memory 508 to temporarily store the logical to physical mapping table.

Figure 7:
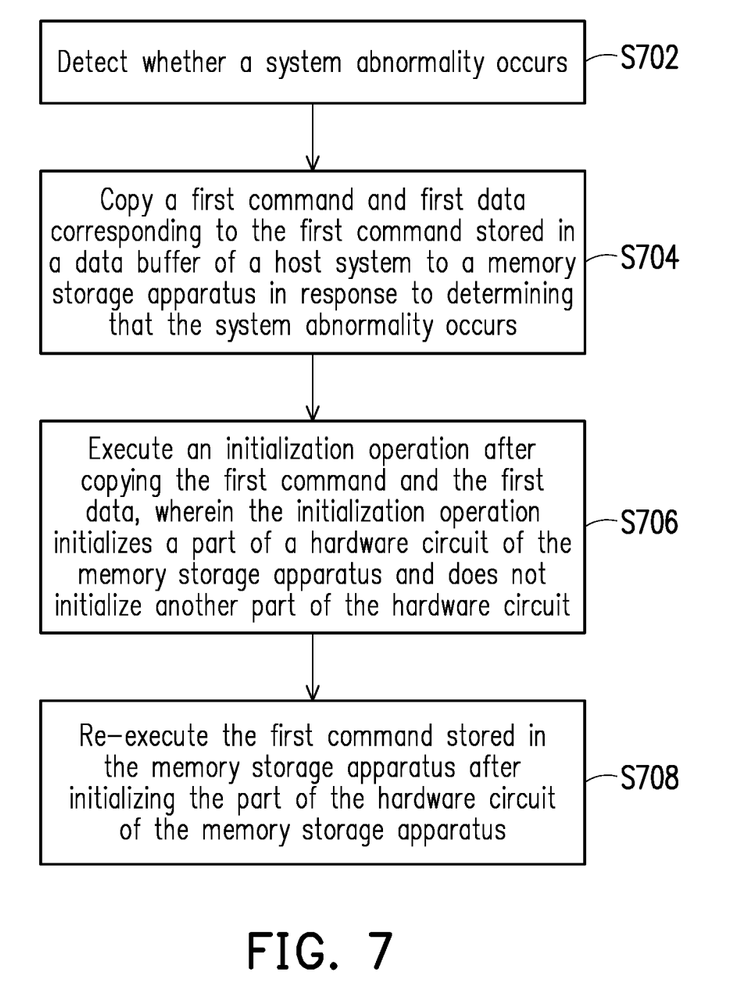
FIG. 7 is a flowchart of a method for managing a host memory buffer according to an exemplary embodiment of the disclosure.

FIG. 7 is a flowchart of a method for managing a host memory buffer according to an exemplary embodiment of the disclosure. Please refer to FIG. 7. In Step S702, whether a system abnormality occurs is detected. In Step S704, a first command and first data corresponding to the first command stored in a data buffer of a host system are copied to a memory storage apparatus in response to determining that the system abnormality occurs. In Step S706, an initialization operation is executed after copying the first command and the first data. The initialization operation initializes a part of a hardware circuit of the memory storage apparatus and does not initialize another part of the hardware circuit. In Step S708, the first command stored in the memory storage apparatus is re-executed after initializing the part of the hardware circuit of the memory storage apparatus.

Figure 8:
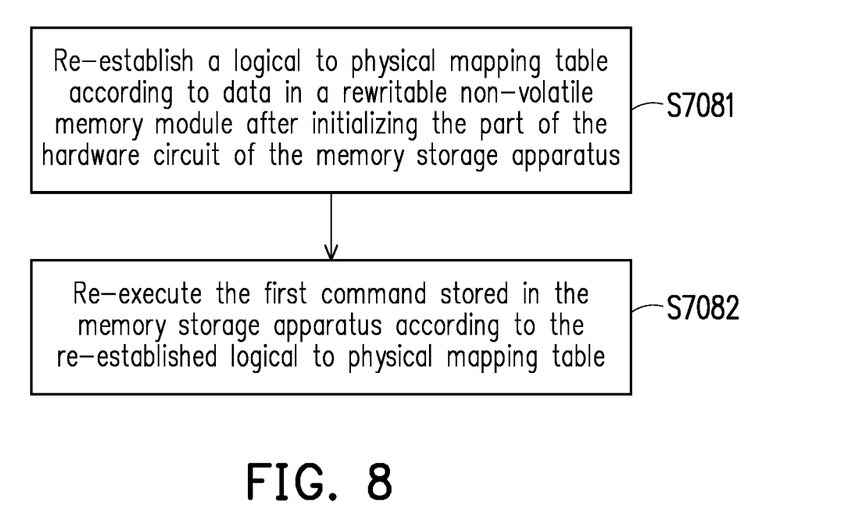
FIG. 8 is a flowchart of a method for managing a host memory buffer according to an exemplary embodiment of the disclosure.

FIG. 8 is a flowchart of a method for managing a host memory buffer according to an exemplary embodiment of the disclosure. Please refer to FIG. 8. In Step S7081, a logical to physical mapping table is re-established according to data in a rewritable non-volatile memory module after initializing the part of the hardware circuit of the memory storage apparatus. In Step S7082, the first command stored in the memory storage apparatus is re-executed according to the re-established logical to physical mapping table.

However, each step in FIG. 7 and FIG. 8 has been according to detail as above and will not be repeated here. It should be noted that each step in FIG. 7 and FIG. 8 may be implemented as multiple program codes or circuits, which is not limited by the disclosure. In addition, the method of FIG. 7 and FIG. 8 may be used in conjunction with the above exemplary embodiments or used alone, which is not limited by the disclosure.

In summary, in the method for managing the host memory buffer, the memory storage apparatus, and the memory control circuit unit provided by the embodiments of the disclosure, outstanding commands are stored in the memory storage apparatus when a system abnormality occurs in the host system or the host memory buffer and a part of the hardware circuit in the memory storage apparatus is initialized. In this way, the loss of commands and data may be avoided, and the host system is ensured to not detect any abnormality in the memory storage apparatus. In addition, the logical to physical mapping table may be re-established after initializing the part of the hardware circuit in the memory storage apparatus to re-execute a command according to the re-established logical to physical mapping table. Based on this, the data of the host memory buffer can be remedied when an unexpected error occurs and the operating efficiency of the memory can be improved.

What is claimed is:

1. A method for managing a host memory buffer, applicable to a host system and a memory storage apparatus, wherein the host system comprises the host memory buffer and a data buffer, and the memory storage apparatus comprises a rewritable non-volatile memory module, the method comprising:
   detecting whether a system abnormality occurs;
   copying a first command and first data corresponding to the first command stored in the data buffer of the host system to the memory storage apparatus in response to determining that the system abnormality occurs;
   executing an initialization operation after copying the first command and the first data, wherein the initialization operation initializes a part of a hardware circuit of the memory storage apparatus and does not initialize another part of the hardware circuit; and
   re-execute the first command stored in the memory storage apparatus after initializing the part of the hardware circuit of the memory storage apparatus,
   wherein the part of the hardware circuit comprises a memory interface in the memory storage apparatus for coupling to the rewritable non-volatile memory module, and the another part of the hardware circuit comprises a host interface in the memory storage apparatus for coupling to the host system.

2. The method for managing the host memory buffer according to claim 1, wherein before the step of copying the first command and the first data corresponding to the first command stored in the data buffer of the host system to the memory storage apparatus in response to determining that the system abnormality occurs, the method further comprises:
   loading an initialization program of an option read only memory of the memory storage apparatus to a random access memory of the host system; and
   executing the initialization program to configure a continuous physical address in the random access memory of the host system to the memory storage apparatus as the host memory buffer of the memory storage apparatus, wherein
   the host memory buffer is configured to store a logical to physical mapping table.

3. The method for managing the host memory buffer according to claim 1, wherein the memory storage apparatus does not comprise a dynamic random access memory.

4. The method for managing the host memory buffer according to claim 1, wherein the system abnormality comprises an abnormal restart or power failure of the host system.

5. The method for managing the host memory buffer according to claim 1, wherein the system abnormality comprises an error in a logical to physical mapping table stored in the host memory buffer.

6. The method for managing the host memory buffer according to claim 5, further comprising:
   determining whether there is an error in the logical to physical mapping table stored in the host memory buffer according to a mapping table status flag, wherein
   the mapping table status flag is generated when the host system confirms that there is an error in the logical to physical mapping stored in the host memory buffer according to a cyclic redundancy check bit.

7. The method for managing the host memory buffer according to claim 1, wherein the step of re-executing the first command stored in the memory storage apparatus after initializing the part of the hardware circuit of the memory storage apparatus comprises:
   re-establishing a logical to physical mapping table according to data in the rewritable non-volatile memory module after initializing the part of the hardware circuit of the memory storage apparatus; and
   re-executing the first command stored in the memory storage apparatus according to the re-established logical to physical mapping table.

8. A memory storage apparatus, comprising:
   a connection interface unit, configured to be electrically connected to a host system, wherein the host system comprises a host memory buffer and a data buffer;
   a rewritable non-volatile memory module;
   a memory control circuit unit, coupled to the connection interface unit and the rewritable non-volatile memory module, wherein
   the memory control circuit unit is configured to detect whether a system abnormality occurs,
   the memory control circuit unit is further configured to copy a first command and first data corresponding to the first command stored in the data buffer of the host system to the memory storage apparatus in response to determining that the system abnormality occurs, the memory control circuit unit is further configured to execute an initialization operation after copying the first command and the first data, wherein the initialization operation initializes a part of a hardware circuit of the memory storage apparatus and does not initialize another part of the hardware circuit, and the memory control circuit unit is further configured to re-execute the first command stored in the memory storage apparatus after initializing the part of the hardware circuit of the memory storage apparatus, wherein the part of the hardware circuit comprises a memory interface in the memory control circuit unit for coupling to the rewritable non-volatile memory module, and the another part of the hardware circuit comprises a host interface in the memory control circuit unit for coupling to the connection interface unit.

9. The memory storage apparatus according to claim 8, further comprising an option read only memory, wherein before the operation of copying the first command and the first data corresponding to the first command stored in the data buffer of the host system to the memory storage apparatus in response to determining that the system abnormality occurs, the memory control circuit unit is further configured to:

load an initialization program of the option read only memory of the memory storage apparatus to a random access memory of the host system, and execute the initialization program to configure a continuous physical address in the random access memory of the host system to the memory storage apparatus as the host memory buffer of the memory storage apparatus, wherein the host memory buffer is configured to store a logical to physical mapping table.

10. The memory storage apparatus according to claim 8, wherein the memory storage apparatus does not comprise a dynamic random access memory.

11. The memory storage apparatus according to claim 8, wherein the system abnormality comprises an abnormal restart or power failure of the host system.

12. The memory storage apparatus according to claim 8, wherein the system abnormality comprises an error in a logical to physical mapping table stored in the host memory buffer.

13. The memory storage apparatus according to claim 12, wherein the memory control circuit unit is further configured to:

determine whether there is an error in the logical to physical mapping table stored in the host memory buffer according to a mapping table status flag, wherein the mapping table status flag is generated when the host system confirms that there is an error in the logical to physical mapping stored in the host memory buffer according to a cyclic redundancy check bit.

14. The memory storage apparatus according to claim 8, wherein in the operation of re-executing the first command stored in the memory storage apparatus after initializing the part of the hardware circuit of the memory storage apparatus, the memory control circuit unit is further configured to:

re-establish a logical to physical mapping table according to data in the rewritable non-volatile memory module after initializing the part of the hardware circuit of the memory storage apparatus, and re-execute the first command stored in the memory storage apparatus according to the re-established logical to physical mapping table.

15. A memory control circuit unit, disposed in a memory storage apparatus and configured to control a rewritable non-volatile memory module, the memory control circuit unit comprising:

a host interface, configured to be coupled to a host system, wherein the host system comprises a host memory buffer and a data buffer;

a memory interface, configured to be coupled to the rewritable non-volatile memory module;

a buffer memory; and a memory management circuit, coupled to the host interface and the memory interface, wherein the memory management circuit is configured to detect whether a system abnormality occurs, the memory management circuit is further configured to copy a first command and first data corresponding to the first command stored in the data buffer of the host system to the memory storage apparatus in response to determining that the system abnormality occurs, the memory management circuit is further configured to execute an initialization operation after copying the first command and the first data, wherein the initialization operation initializes a part of a hardware circuit of the memory storage apparatus and does not initialize another part of the hardware circuit, and the memory management circuit is further configured to re-execute the first command stored in the memory storage apparatus after initializing the part of the hardware circuit of the memory storage apparatus, wherein the part of the hardware circuit comprises the memory interface, and the another part of the hardware circuit comprises the host interface.

16. The memory control circuit unit according to claim 15, wherein the memory storage apparatus further comprises an option read only memory, and before the operation of copying the first command and the first data corresponding to the first command stored in the data buffer of the host system to the memory storage apparatus in response to determining that the system abnormality occurs, the memory management circuit is further configured to:

load an initialization program of the option read only memory of the memory storage apparatus to a random access memory of the host system, and execute the initialization program to configure a continuous physical address in the random access memory of the host system to the memory storage apparatus as the host memory buffer of the memory storage apparatus, wherein the host memory buffer is configured to store a logical to physical mapping table.

17. The memory control circuit unit according to claim 15, wherein the memory storage apparatus does not comprise a dynamic random access memory.

18. The memory control circuit unit according to claim 15, wherein the system abnormality comprises an abnormal restart or power failure of the host system.

19. The memory control circuit unit according to claim 15, wherein the system abnormality comprises an error in a logical to physical mapping table stored in the host memory buffer.

20. The memory control circuit unit according to claim 19, wherein the memory management circuit is further configured to:

determine whether there is an error in the logical to physical mapping table stored in the host memory buffer according to a mapping table status flag, wherein the mapping table status flag is generated when the host system confirms that there is an error in the logical to physical mapping stored in the host memory buffer according to a cyclic redundancy check bit.

21. The memory control circuit unit according to claim 15, wherein in the operation of re-executing the first command stored in the memory storage apparatus after initializing the part of the hardware circuit of the memory storage apparatus, the memory management circuit is further configured to:
 re-establish a logical to physical mapping table according to data in the rewritable non-volatile memory module after initializing the part of the hardware circuit of the memory storage apparatus, and
 re-execute the first command stored in the memory storage apparatus according to the re-established logical to physical mapping table.

* * * * *